United States Patent [19]

Hultsch

[11] 4,101,421

[45] Jul. 18, 1978

[54] CENTRIFUGE DRUM WITH LATERAL FILTRATION

[75] Inventor: Günther Hultsch, Munich, Fed. Rep. of Germany

[73] Assignee: Krauss-Maffei Aktiengesellschaft, Munich, Fed. Rep. of Germany

[21] Appl. No.: 762,171

[22] Filed: Jan. 24, 1977

[30] Foreign Application Priority Data

Jan. 30, 1976 [DE] Fed. Rep. of Germany ....... 2603610

[51] Int. Cl.[2] ........................ B01D 21/26; B01D 33/02

[52] U.S. Cl. .................................... 210/78; 210/378; 210/381

[58] Field of Search .................... 210/78, 378, 381, 66, 210/74

[56] References Cited

U.S. PATENT DOCUMENTS

| | | | |
|---|---|---|---|
| 1,761,593 | 6/1930 | Sharples | 210/66 |
| 2,976,998 | 3/1961 | Smith | 210/78 |
| 3,864,256 | 2/1975 | Hultsch et al. | 210/78 |
| 3,943,056 | 3/1976 | Hultsch et al. | 210/78 |

FOREIGN PATENT DOCUMENTS

| | | | |
|---|---|---|---|
| 1,025,793 | 6/1963 | Fed. Rep. of Germany | 210/78 |
| 1,151,764 | 7/1963 | Fed. Rep. of Germany | 210/78 |

*Primary Examiner*—William A. Cuchlinski, Jr.
*Assistant Examiner*—Gregory N. Clements
*Attorney, Agent, or Firm*—Karl F. Ross

[57] ABSTRACT

A centrifuge for the separation of solids from liquids has a centrifuge drum rotatable about a substantially horizontal axis and formed, in addition to the filtering periphery, with a perforated ring annular disk transverse to this periphery for increased separation of liquid. The filtering ring, which lies inwardly of the perforated shell of the centrifuge advantageously opens toward an annular trough having the same radius as the ring or a greater radius. The trough is provided with a scoop or other emptying device to permit the radial position of the liquid level therein to be adjusted and/or to permit discharge of the trough.

8 Claims, 3 Drawing Figures

CENTRIFUGE DRUM WITH LATERAL FILTRATION

CROSS-REFERENCE TO RELATED APPLICATION

This application is related to the commonly owned copending application Ser. No. 662,163 filed 27 Feb. 1976 (now U.S. Pat. No. 4,052,303 issued 4 Oct. 1977) and the prior U.S. Pat. No. 3,943,056 of which said application is a continuation-in-part.

FIELD OF THE INVENTION

The present invention relates to a lateral filtration centrifuge and, more particularly, to a method of operating a centrifuge with side filtration and to a centrifuge drum utilizing side filtration in addition to radial or peripheral separation of the filtrate from the filtrant.

BACKGROUND OF THE INVENTION

A horizontal centrifuge for the separation of solids from liquids, e.g. in the dewatering of solids, can comprise a centrifuge drum rotatable about a substantially horizontal axis and having at one axial end, an inlet into which a mixture, slurry or suspension of the solids and the liquid can be introduced for distribution along the cylindrical wall of the centrifuge. This wall, generally referred to as the periphery of the drum, is formed with a multiplicity of openings through which the liquid is expressed by centrifugal force as the drum is rotated with relatively high speeds. A filter cake builds up along the interior of the drum periphery as the solids collect therealong and means can be provided to remove the filter cake at suitable intervals or even continuously if desired. The centrifuge may include means for introducing a washing liquid into the interior of the drum so that this liquid also passes through the filter cake and entrains soluble materials therewith. The inner wall of the drum can be lined with a filter material (filter cloth) defining the mesh size for the filtration process and hence approximately the minimum particle size which can be trapped in the filter cake.

It is known, in order to expedite the filtering operation, to provide a filter drum of such a centrifuge with a filter ring (annular disk) at an end of the centrifuge, generally opposite the inlet for the mixture or suspension. This filter ring, which lies inwardly of the perforated cylindrical wall of the centrifuge drum, is likewise perforated and can be lined with a filtering medium (e.g. the filter cloth) to increase the rate at which the liquid phase is displaced from the drum.

Such systems have been found to be especially effective for the separation of solids from liquids in suspensions (i.e. the dewatering of suspensions). The advantage of such lateral-ring filters is that, when the solids collect rapidly on the filtering surfaces, they tend to impede the throughflow of liquid and, since the centrifugal force drives the solids primarily against the cylindrical wall of the drum, the filter ring remains less obscured and hence permits the rapid draining of liquid from the drum in regions inwardly of the filter cake. As a consequence, a portion of the liquid is not required to traverse the entire thickness of the filter cake in a radial direction. Consequently, such centrifuges have found use wherever a high throughput of liquid is required during the separating operation.

However, they also present certain difficulties, especially when the filter cake is to be washed thoroughly.

In such cases, if the washing liquid is permitted to flow predominantly through the side ring, the liquid will not be able to traverse the thickness of the filter cake and the washing will be ineffective. As a practical matter, solvent washing processes cannot be carried out in such drums or with centrifuges embodying same.

OBJECTS OF THE INVENTION

It is the principal object of the present invention to provide an improved centrifuge drum having a lateral filter ring, in addition to a perforated periphery, whereby the aforementioned disadvantages are obviated.

Another object of this invention is to provide, for a filter drum of the above-described type, improved means for enabling the washing of the filter cake therein and, more specifically, for controlling the throughflow of liquid at the filter ring.

Still another object of the invention is to provide an improved centrifuge having a drum with a lateral filter ring and controlled liquid flow through this ring, and an improved method of operating a centrifuge for the separation of solids from liquids.

SUMMARY OF THE INVENTION

These objects and others which will become apparent hereinafter are attained, in accordance with the present invention, in a centrifuge drum for a separating centrifuge adapted to recover particulate solids or the like from a liquid phase and, moreover, to wash the collected solids or filter cake, which comprise a perforated shell, generally of cylindrical configuration for the main separation of the solids from the liquids, and, at one end of the drum, a perforated filter ring annular disk lying inwardly of the periphery of the perforated shell.

According to the invention, there is provided an annular chamber or trough which communicates with the orifices of this perforated ring and is rotatable with the drum, the trough having the same radius as the ring (maximum radius) or a greater radius and cooperating with an emptying device such as a scooping tube through which the annular chamber can be discharged. Such tubes may be of the type illustrated and described in the aforementioned copending application and the prior application mentioned therein.

According to a feature of the invention, the emptying device includes a scooping tube which is mounted to swingably adjust the distance by which its mouth penetrates into the trough, i.e. the radical spacing of the mouth of the tube from the axis of rotation of the drum which is preferably rotatable about a horizontal or substantially horizontal axis. The mouth of the tube is open in a direction opposite to the direction of rotation of the drum so that the entrainment of the liquid in the trough by the drum drives the liquid through the mouth of the tube and out of the latter when the mouth of the tube is introduced beneath the "level" of the liquid in the trough. Since the centrifugal force distributes the liquid in the trough substantially uniformly, this level can be a variable distance from the axis of the drum, the distance being adjusted by swinging the mouth of the tube toward or away from the axis. The scoop tube can, moreover, be swingable about an axis which is parallel to the axis of the drum.

The centrifuge drum can be formed with an end plate at one axial end of the perforated shell to support the drum on the drum shaft, the other axial end of the drum being open to receive the suspension-washing liquid or any other material which must be introduced into the drum and to permit removal of the filter cake when the latter is continuously or intermittently discharged. In this case, the end plate can define with the perforated filter ring, which generally lies in a plane parallel to the plane of the end plate and perpendicular to the axis of the drum, an annular chamber communicating with the trough at spaced apart locations along the outer edge of this chamber, e.g. openings provided in the plate. The plate can also carry the trough or form the same. Consequently the perforated filter ring can lie between at least the outer portion of the plate and the interior of the drum to which the suspension is delivered. An axially opening annular recess can be formed in this outer periphery of this plate and can be spanned by the filter ring to define the chamber.

According to still another feature of the invention, means can be provided for filling the trough and/or the chamber and/or leading fluid into the interior of the drum through the perforation in the ring and such means can, in a preferred embodiment, be coupled with the discharge device.

According to still another feature of the invention, the orifices, passages or openings communicating between the trough and the filter plate can be provided with check valves or the like to permit flow only from the interior of the drum to the trough and not in the opposite direction.

The system of the present invention has been found to be highly effective for the separation of suspensions and permits effective control of the outflow of the filtrate from the interior of the drum over the filter ring.

It is especially effective for controlling the outflow and even preventing the outflow of the washing liquid through the filter ring. For example, when liquid is not scooped out of the trough, it will reach a "level" at a radial distance from the axis such that further passage of liquid into the trough will be prevented by the back pressure of the centrifugal force on the liquid head within the trough so that the only flow path for the washing liquid is through the filter cake and out through the perforations in the shell.

The system also has the advantage that it allows the buildup to any desired degree, of a layer of liquid during the beginning of filtration to insure uniform distribution of the filter cake upon the shell. There is no tendency during this period for the liquid to rush to the perforated ring. Finally, it facilitates washing with a minimum amount of washing liquid.

Because the system may be equipped with means for introducing liquid into the drum through the scoop and liquid removal arrangement cooperating with the trough, it is possible, if desired, to back wash to a certain extent or to fill the drum with liquid before the suspension is introduced into the latter, again facilitating uniform distribution of the suspension in the drum at the inception of filtration.

BRIEF DESCRIPTION OF THE DRAWING

The above and other objects, features and advantages of the present invention will become more readily apparent from the following description, reference being made to the accompanying drawing, in which.

SPECIFIC DESCRIPTION

Figure 1:
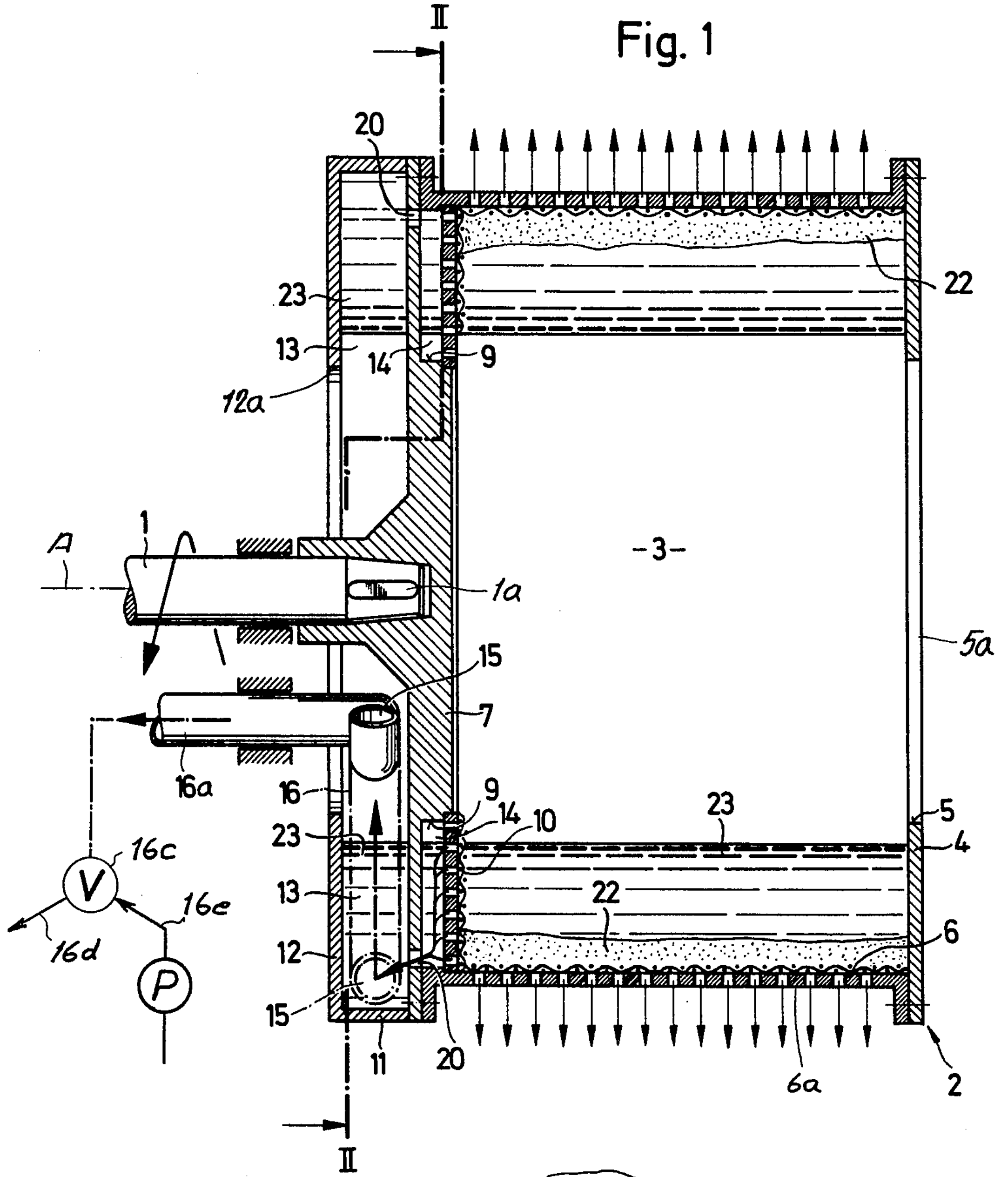
FIG. 1 is an axial cross-sectional view through a centrifuge drum according to the invention.

In the drawing I have shown a centrifuge drum 2 which is mounted on a shaft 1 by a key 1*a* and is driven about a horizontal axis A by means not shown.

The interior of the centrifuge drum 3 is defined by a perforated shell 6*a* inwardly lined by a layer 6 of the filter cloth or other filter material. At one axial end, the drum is provided with an inwardly extending annular flange or ring 4 whose inner edge surrounds an opening 5*a* through which the suspension can be introduced, the filter cake can be removed, and a washing liquid can be sprayed as described in the aforementioned copending application.

Figure 2:
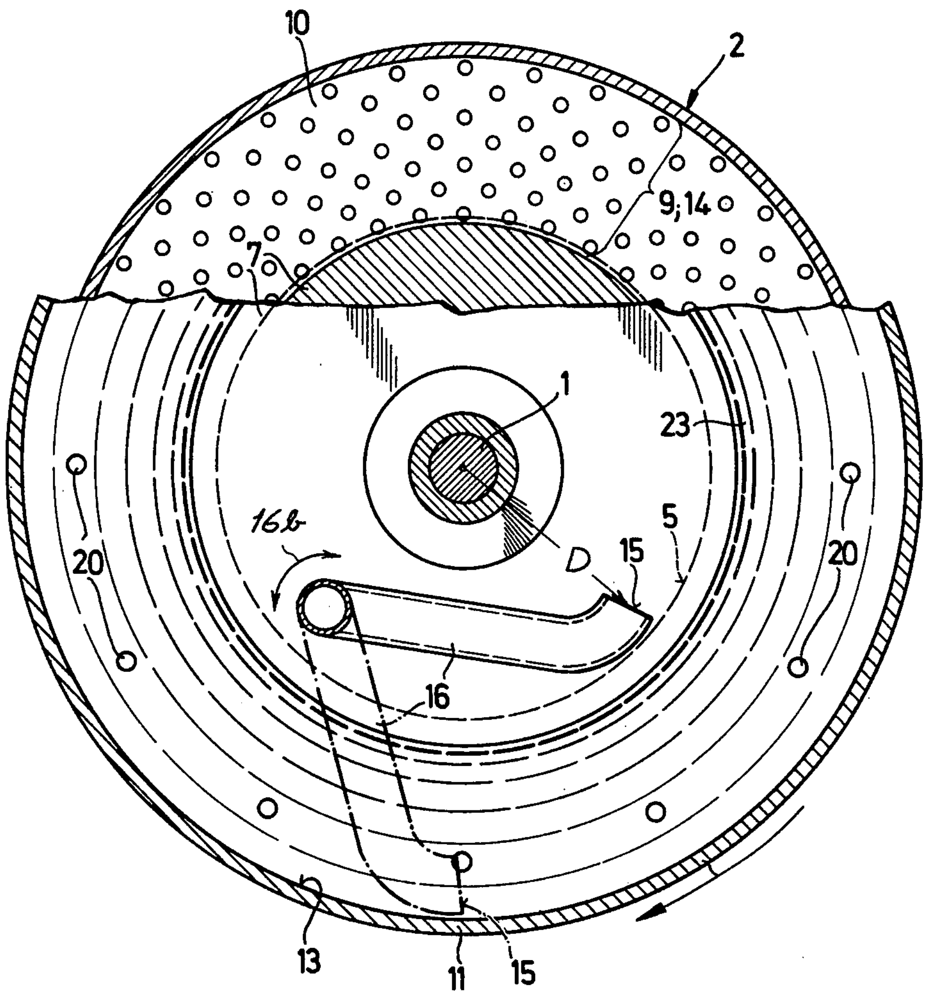
FIG. 2 is a section taken along the line II—II of FIG. 1.

At its other axial end, the drum is formed with an end plate 7 provided with an axially open peripheral recess 9 turned toward the interior 3 of the drum and spanned by a filter ring 10 which delimits the space 3 in the region in which the liquid can build up in the drum upon operation. The recess thus defines a slider chamber 14 which communicates with a trough or annular chamber 13 formed on the opposite side of the plate 7 and rotatable with the latter and the remainder of the drum. The trough is formed by an axially extending annular wall 11 which can be disposed radially outwardly of the shell 6*a*, and an annular flange or wall 12 lying in a plane perpendicular to the axis A and parallel to the plane 7. The inner edge 12*a* clears the shaft 1 and an axially extending portion 16*a* of a scoop tube 16 which has a mouth 15 open opposite the direction of rotation of the drum and adapted to be swung into and out of the latter as represented by the arrow 16*b* in FIG. 2. It is thus possible to vary the radial distance D of the mouth of the tube from the axis.

Figure 3:
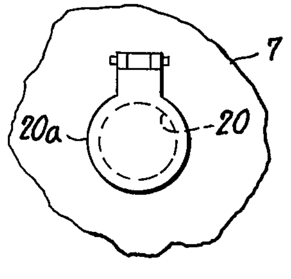
FIG. 3 is a detail view of a check valve according to an embodiment of the invention.

At the outer edge of the plate 7 there are provided openings or passages 20 which connect the chamber 14 with the interior of trough 13. As can be seen from FIG. 3, these openings may each be provided with a flap-type check valve 20*a* which can prevent reverse flow of liquid from the trough to the interior of the drum.

At the beginning of the separation process, the end 15 is swung radially inwardly so that the distance D is smaller than the radius of the inner edge 5 of the flange 4.

The suspension is then introduced into the drum and, since liquid is not scooped from the trough 13, builds up as shown at 23 so that the solids are disposd in a filter cake 22 uniformly along the shell 6, 6*a*. With the application of centrifugal force, the greater portion of the liquid flows radially through the perforations in the shell 6, 6*a*.

When the scoop 16 is swung outwardly (broken line position in FIG. 2), liquid is scooped from the trough and a substantially continuous flow of liquid is permitted as represented by the arrows, through the perforations in the filter ring 20, the chamber 14, the openings 20 until the level therein reaches the mouth of the scoop tube 16. The filter process then proceeds in the usual manner. When accumulation of liquid is desired, the tube 16 is swung radially inwardly and swinging movement can apply to the filtering operation or the subsequent washing operation. It is therefore possible to use the scoop tube 16 to control the lateral filtration through the rings 10 such that there is substantially no liquid flow or a maximum liquid counterflow through the latter or any rate of flow therebetween depending upon the radial position of the mouth 5.

Since the ring or annular disk 10 is carried by the plate 7 and the latter extends to the shell **6*a*, the filtering ring 10** is free from unbalanced forces and can be mounted lightly in the drum.

While the ring 10 has been shown to be disposed between the interior of the drum 3 and the plate 7, it can also be disposed behind the latter without difficulty. The embodiment shown in the drawing, however, has the advantage that the solids are all retained in the interior 3 of the centrifuge drum and the chamber 14 is kept clear of such solids. The ring 10 is so disposed in the recess 9 that, upon introduction of the suspension, suspension particles do not enter the chamber 14.

When the duct **16*a* of the scoop 2 is provided with a valve 16*c* which can selectively communicate between a drain 16*d* and a supply 16*e* of liquid, it is possible to use the emptying device also for introduction of a washing liquid. Furthermore, if it is desired to use this reverse flow of liquid only to establish a given head in the trough, the openings 20 ccan be provided with the check valves mention in connection with FIG. 3 so that reverse flow of liquid from the trough 13 is precluded. The liquid pressure in the trough 13** thus holds the check valves close.

I claim:

1. A suspension-separating centrifuge comprising:
a support;
a drum mounted for rotation on said support;
a driving shaft rotatable on said support and keyed to said drum for rotating said drum about an axis, said drum including
a perforated shell forming a body of revolution surrounding said axis and adapted to centrifugally discharge liquid from a suspension and collect a filter cake on the interior of said shell upon rotation of said drum,
a filter ring lying transversely of said shell at one axial end thereof, said ring lying in a plane substantially perpendicular to said axis and being formed with perforations, wall means lying transversely of said shell at the other axial end thereof, and
means on said drum forming an annular chamber of a radius at least equal to that of said ring and communicating with the interior of said drum through perforations formed in said ring; and
means for withdrawing liquid from said annular chamber, said annular chamber being formed as an inwardly open trough, said means for withdrawing liquid being a scoop tube displaceable on said support to extend to an adjustable depth into said trough and forming a liquid outlet for withdrawing liquid from said trough.

2. The centrifuge defined in claim 1 wherein the only connection between said drum and said shaft is an end plate at said end of said shell, said filter ring being disposed parallel and proximal to said end plate, said end plate defining with said ring a further chamber between said ring and said trough, said end plate being formed with a plurality of openings communicating between the interior of said shell and the interior of said trough.

3. The drum defined in claim 2 wherein said end plate is formed with a recess open toward the interior of said drum and spanned by said ring.

4. The drum defined in claim 2 wherein said scoop tube is provided with means enabling the introduction of liquid into said trough therethrough.

5. The drum defined in claim 2, further comprising respective check valves at each of said openings for preventing flow of liquid from said trough to said interior.

6. A centrifuge for the separation of solids from liquid in a suspension, comprising:
a support;
a centrifuge drum mounted for rotation on said support;
a driving shaft rotatable on said support and keyed to said drum for rotating said drum about an axis, said drum including:
a substantially cylindrical perforated shell centered on said axis and adapted to centrifugally discharge liquid from said suspension and collect a filter cake on the interior of said shell upon rotation of said drum,
a filter ring connected to said shell and lying in a plane perpendicularly to said axis at one end of said shell, said ring being perforated,
means connected with said shell and said ring forming an inwardly open annular trough communicating with the interior of said shell through the perforations in said ring,
an end plate disposed between said trough at said end of said shell and said ring and defining a compartment between said trough and said ring, said end plate being formed with spaced apart openings, communicating between said compartment and said trough whereby liquid can flow through said ring into said compartment and from said compartment into said trough through said openings, and
respective check valves at each of said openings for preventing flow of liquid from said trough toward the interior of said shell; and
a scoop tube mounted on said support and displaceable to extend to an adjustable depth into said trough and form a liquid outlet for withdrawing liquid from said trough.

7. A method of operating a centrifuge for the separation of a liquid filtrate from solids in suspension in the liquid and adapted to form a filter cake which is subsequent washed, the centrifuge drum having a perforated shell forming a body of revolution centered on an axis for rotation of the drum and a perforated filter ring at least at one end of said shell whereby liquid passes through both said shell and said ring upon rotation of the drum to deposit said filter cake on said shell, said drum having a drive shaft for rotating same about said axis and means forming a trough at said end of said drum receiving liquid passing through said ring, said method comprising the steps of:
(a) introducing said suspension into the interior of said drum and rotating same to centrifugally displace said liquid through the perforations in said shell and said ring to deposit said filter cake on said shell;
(b) withdrawing liquid from said trough during step (a);
(c) terminating the introduction of the suspension into said drum while retaining the filter cake on said shell and terminating withdrawal of liquid from said trough; and
(d) introducing a wash liquid into said drum while continuing to rotate same and permitting liquid to accumulate in said trough without withdrawal to wash said filter cake with a washing liquid passing from the interior of said drum only through said shell.

8. The method defined in claim 7 wherein the wash liquid is introduced into the interior of said drum by supplying it to said trough.

* * * * *